United States Patent [19]

Steps

[11] Patent Number: 4,858,111
[45] Date of Patent: Aug. 15, 1989

[54] WRITE-BACK CACHE SYSTEM USING CONCURRENT ADDRESS TRANSFERS TO SETUP REQUESTED ADDRESS IN MAIN MEMORY BEFORE DIRTY MISS SIGNAL FROM CACHE

[75] Inventor: Steven C. Steps, San Jose, Calif.

[73] Assignee: Hewlett-Packard Company, Palo Alto, Calif.

[21] Appl. No.: 921,876

[22] Filed: Oct. 20, 1986

Related U.S. Application Data

[63] Continuation of Ser. No. 518,610, Jul. 29, 1983, abandoned.

[51] Int. Cl.[4] .................. G06F 7/02; G06F 9/00; G06F 12/02
[52] U.S. Cl. .................. 364/200; 364/243.41; 364/247.4; 364/239.5; 364/259.2
[58] Field of Search ... 364/200 MS File, 900 MS File

[56] References Cited

U.S. PATENT DOCUMENTS

| | | | |
|---|---|---|---|
| 3,618,040 | 11/1971 | Iwamoto et al. | 364/200 |
| 3,771,137 | 11/1973 | Barner et al. | 364/200 |
| 3,967,247 | 6/1976 | Anderson et al. | 364/200 |
| 3,974,479 | 8/1976 | Kotok et al. | 364/200 |
| 4,161,024 | 7/1979 | Joyce et al. | 364/200 |
| 4,264,953 | 4/1981 | Douglas et al. | 364/200 |
| 4,460,959 | 7/1984 | Lemay et al. | 364/200 |
| 4,484,275 | 11/1984 | Katzman et al. | 364/200 |
| 4,493,026 | 1/1985 | Olnowich | 364/200 |
| 4,495,575 | 1/1985 | Eguchi | 364/200 |
| 4,525,780 | 6/1985 | Bratt et al. | 364/200 |

FOREIGN PATENT DOCUMENTS

| | | | |
|---|---|---|---|
| 55-67984 | 5/1980 | Japan | 364/200 |
| 55-67985 | 5/1980 | Japan | 364/200 |
| 57-30043 | 2/1982 | Japan | 364/200 |

OTHER PUBLICATIONS

Berkehite et al., "High Speed Cache in Front of Low Speed Storage", IBM TDB, vol. 25, No. 8, Jan., 1983, pp. 4287–4288.
William D. Strecker, "Computer Engineering-A Dec View of Hardware System Design", 1978, pp. 263–267.

*Primary Examiner*—Archie E. Williams, Jr.
*Assistant Examiner*—Thomas Lee
*Attorney, Agent, or Firm*—Jeffery B. Fromm

[57] ABSTRACT

A computer system in which only the cache memory is permitted to communicate with main memory and the same address being used in the cache is also sent at the same time to the main memory. Thus, as soon as it is discovered that the desired main memory address is not presently in the cache, the main memory RAMs can be read to the cache without being delayed by the main memory address set up time. In addition, since the main memory is not accessable other than from the cache memory, there is also no main memory access delay caused by requests from other system modules such as the I/O controller. Likewise, since the contents of the cache memory is written into a temporary register before being sent to the main memory, a main memory read can be performed before doing a writeback of the cache to the main memory, so that data can be back to the cache in approximately the same amount of time required for a normal main memory access. The result is a significant reduction in the overhead time normally associated with cache memories.

8 Claims, 3 Drawing Sheets

WRITE-BACK CACHE SYSTEM USING CONCURRENT ADDRESS TRANSFERS TO SETUP REQUESTED ADDRESS IN MAIN MEMORY BEFORE DIRTY MISS SIGNAL FROM CACHE

This is a continuation of application Ser. No. 518,610, filed July 29, 1983, now abandoned.

BACKGROUND OF THE INVENTION

The use in computer systems of relatively small, high speed cache memories in conjunction with large, relatively slow main memories is well known as explained in "Computer Engineering—A DEC View of Hardware System Design", Chapter 10, pages 263–267, entitled "Cache Memories for PDP-11 Family Computers" by William D. Strecker. Such cache memories act as a buffer between the main memory and a central processor (CPU). Thus, the CPU fetches information (i.e., instructions and data) through the cache rather than directly from the main memory in order to reduce execution time in the overall system.

Normally, in a system which uses a store-to type cache, whenever the address in the cache is not the same as the address in the main memory to which the CPU wants to write (i.e., a "miss") and the data presently stored in the cache location has previously been changed from the data stored in the corresponding location in main memory (i.e., the cache is "dirty") the cache must always write its data back to the main memory before doing a read of new data from the main memory. Unfortunately, main memory accesses are relatively slow since the main memory address must have time to settle before an access can begin and the time required before valid data appears at the outputs of the random access memories (RAMs) used in the main memory after a valid address is present at the main memory address inputs is quite long. Therefore, main memory accesses hold up the operation of the entire computer system.

Thus, the time penalty for a clean cache miss is one main memory read access, and the time penalty for a dirty cache miss, unfortunately, is two main memory accesses: one to write back the old data and one to read in the new data. If the effective time penalty for a dirty cache miss could be reduced to only one main memory access, overall system performance would be significantly improved.

SUMMARY OF THE INVENTION

In the present invention the main memory is permitted only to communicate with the cache memory and the arbitration of requests from other modules such as the I/O controller is handled by the cache rather than the main memory so that the cache and main memory state machines can be linked together. Thus, the same address being sent by the CPU to the cache can simultaneously be sent to the main memory and cache miss fault handling can essentially begin in parallel with the cache access.

In addition, data from the cache which is destined for the main memory is set aside into a temporary register while the fault determination is being made so that useful data from the main memory can be read immediately into the cache before the previous contents of the cache are written back to the main memory.

The result is that the present cache architecture typically handles dirty misses about twice as fast as the prior art while using the same type of RAMs. Thus, dirty misses, (i.e., modified locations in the cache which require a writeback to the main memory) typically do not slow down the system any more than do clean misses.

DETAILED DESCRIPTION OF THE INVENTION

Figure 1:
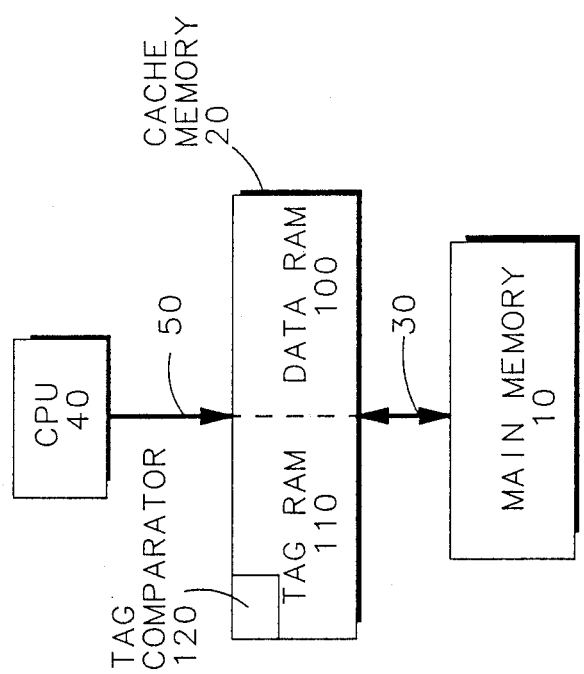
FIG. 1 shows a portion of a computer system according to the prior art.

FIG. 1 shows portions of a typical computer system according to the prior art. A main memory 10 is connected to a cache memory 20 via a first data bus 30 and the cache memory 20 is connected to a central processor (CPU) 40 via a second data bus 50. The cache memory 20 includes high speed data RAMs 100 to and from which the CPU 40 exchanges data, tag RAMs 110 for storing the most significant bits of address of the corresponding memory location in the main memory 10, and a tag comparator 120 for determining whether the address in the tag RAMs 110 agrees (i.e., a "hit") or disagrees (i.e., a "miss") with the address desired by the CPU 40.

Figure 3:
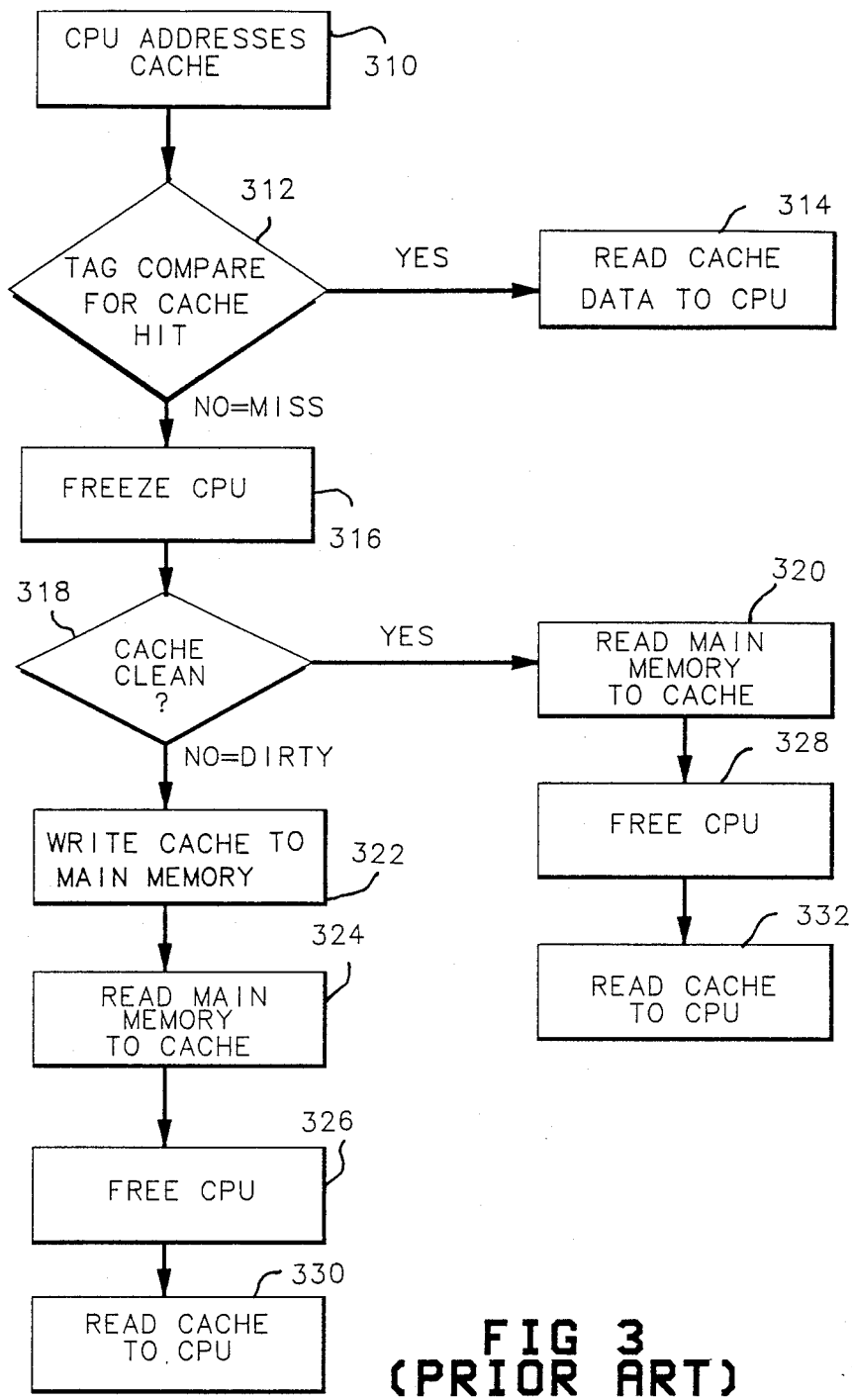
FIG. 3 shows a flow-chart of a memory access in a computer system according to the prior art.

Normally as shown in FIG. 3, the CPU 40 reads and writes its data immediately to or from the cache 20 since more often than not there is a "hit", as shown at 310, 314. However, when a "miss" is detected by the tag comparator 120, as shown at 312, there are two possibilities, as shown at 18: either the data in the cache data RAMs 100 is the same as the data in the corresponding location in the main memory 10 (i.e., the cache data is "clean") or the data in the cache data RAMs 100 has previously been changed so that it is now different from the corresponding location in the main memory 10 (i.e., the cache data is "dirty"). For the case of a clean cache miss, one main memory access is required to read the requested data from the main memory 10 into the cache 20, as shown at 320. For the case of a dirty miss, two main memory accesses are required: one to write the old cache data back to the main memory 10, as shown at 322, and one to read the requested data from the main memory 10 into the cache 20, as shown at 324. In either case of a miss, the CPU 40 must be temporarily halted, as shown at 316 (i.e., "frozen") when it is reading data from the cache memory 20 to prevent further execution with incorrect (i.e., "faulty") data. Only after the proper data has reached the cache 20 to then be read by the CPU 40, as shown at 330, 332, can the CPU 40 be unfrozen, as shown at 326, 328.

Thus, in the prior art, for the case of a dirty miss, the writeback of old data from the cache 20 to the main memory 10 had to occur before the read of new data from the main memory 10 into the cache 20. If the read of new data from the main memory 10 to the cache 20 occurs first, the old data is written over and lost.

Figure 2:
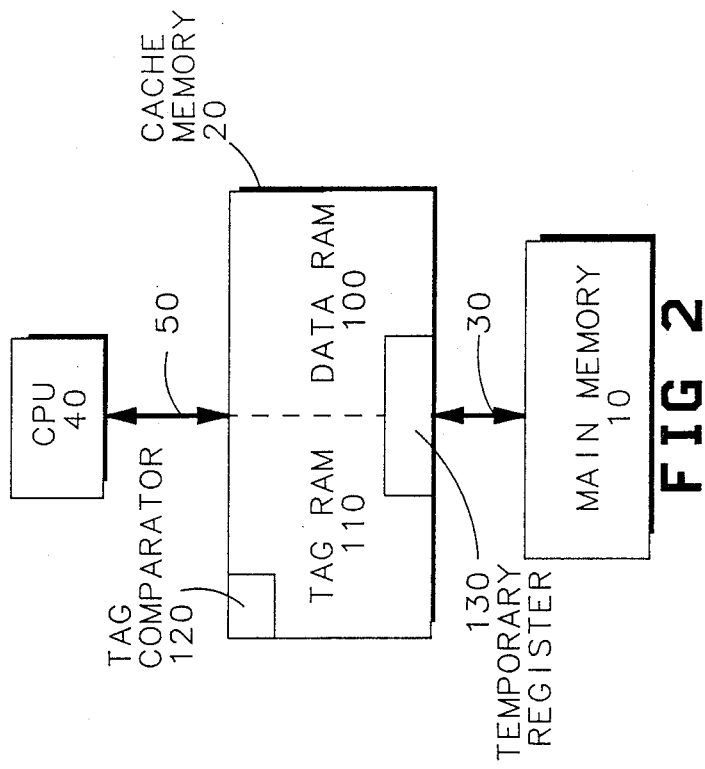
FIG. 2 shows a portion of a computer system according to a preferred embodiment of the present invention.
Figure 4:
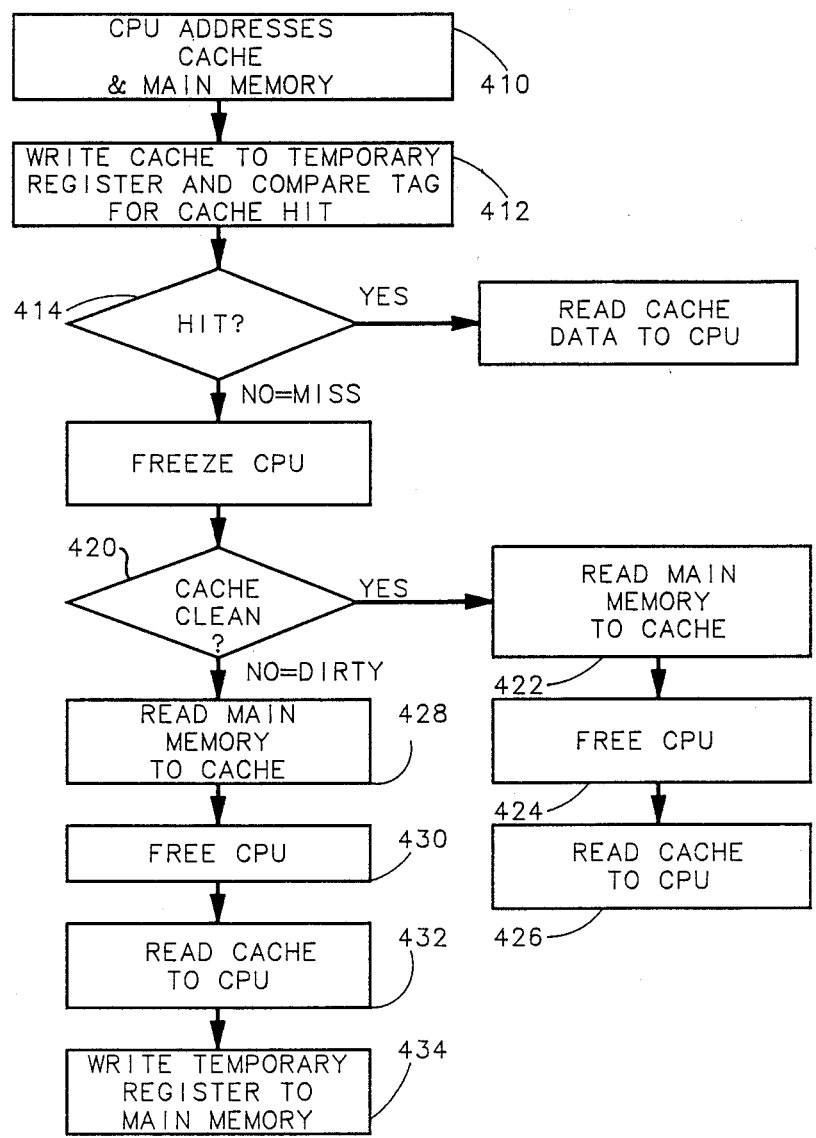
FIG. 4 shows a flow-chart of a memory access in a computer system according to the present invention.

FIGS. 2 and 4 shows a preferred embodiment of the present invention. A temporary register 130 has been added to the cache memory 20 to hold data from the data RAMs 100 before the data is written back to the main memory 10. The address generated by the CPU 40 is simultaneously sent to both the cache 20 and the main memory 10, as shown at 410, so that the main memory address can be set up ahead of time in case a miss indicates that a main memory access is needed, as shown at 414 et seq.

In the present invention, the read of new data from the main memory 10 to the cache memory 20 can occur before the writeback of old data from the cache memory 20 to the main memory 10, as shown at 428, because the old data from the cache memory 20 is first stored in the temporary register 130, as shown at 412. Because on a read from the cache memory 20 to the CPU 40 the CPU 40 remains frozen until the new data is read from the main memory 10 into the cache 20, the present invention significantly decreases the time penalty for a dirty cache miss.

Before the dynamic RAMs that make up the main memory 10 can be read from or written to, an address must be sent to the main memory 10 with allowance for set up time. The time required to send the address plus the set up time is on the order of 100 ns. In the prior art, the address could not be sent from the cache memory 20 to the main memory 10 until the tag comparator 120 signalled a clean or a dirty miss. For a clean miss the address for the new read data is sent, as shown at 422, 424, 426; for a dirty miss the address for the old write data is sent. In the present invention the address for the new read data is always sent and this occurs before the hit or miss indication is generated by the tag comparator 120. The result is a significant increase in system performance.

In the present invention, when the tag comparator 120 detects a "miss", the cache 20 signals the main memory 10 to send to the cache 20 the read data from the corresponding CPU address, as shown at 428. Because this address has previously been sent to the main memory 10, there is no address set up delay. Once the main memory 10 has sent this data to the cache 20 the CPU can continue, as shown at 430, 432. The cache processing is completed by writing the contents of the temporary register 130 to the appropriate address in the main memory 10 in the case of a dirty miss, as shown at 434, since the temporary register 130 holds the dirty data from the cache 20 that needs to be written back to the main memory 10, and the CPU can continue processing at the same time.

What is claimed is:

1. In a computer system comprising a central processing unit (CPU), a write-back cache memory unit (cache) having a data store and a comparator for indicating whether information requested by the CPU from the cache is a hit, a clean miss, or a dirty miss, and a main memory unit (main memory), said units coupled so that the main memory can communicate only with the cache and so that the CPU can fetch information from and store information to the main memory only via the cache, and further coupled so that state machines representing the states of the cache and the main memory, respectively, are linked together, a method comprising the steps of:
    (a) simultaneously sending an address of information desired to be read from the cache by the CPU from the CPU to both the cache and main memory at such a time that said address is set up in the main memory prior to receiving a dirty miss indication from the comparator;
    (b) fetching the encached copy of said information from the data store and then temporarily buffering the fetched information in the computer system prior to receiving said dirty miss indication from said comparator; and,
    (c) storing a copy of the desired information fetched from the main memory into the cache if either a clean or dirty miss indication is provided by the comparator;
    wherein step (c) takes place before dirty information buffered in the system is written back to the main memory if the comparator provides a dirty miss indication.

2. A method as in claim 1 wherein step (c) comprises signaling the main memory from the CPU to send read information to the cache as soon as it is known that a clean or dirty miss of the desired information in the cache has occurred; and
    step (b) comprises comparing an address of the cache to an address sent from the CPU with the comparator while buffering the encached information to a temporary register.

3. A method as in claim 2, if the CPU has requested fetch of information from the main memory to the cache, further comprising:
    freezing the CPU as soon as a clean or dirty miss of the desired information in the cache is indicated by the comparator.

4. A method as in claim 3, further comprising:
    fetching information from the main memory to the cache;
    waiting for an indication from the comparator to the CPU that the information has been transferred from the main memory to the cache;
    unfreezing the CPU; and
    reading the information by the CPU from the cache substantially within one main memory access period after either a clean miss or a dirty miss.

5. A method as in claim 4 if a dirty miss of the cache is indicated by the comparator, further comprising after the step of fetching information from the main memory to the cache, the step of:
    storing the information in the temporary register back to the main memory unit.

6. In a computer system comprising a central processing unit (CPU), a write-back cache memory unit (cache) having a data store and a comparator for indicating whether information requested by the CPU from the cache is a hit, a clean miss, or a dirty miss, and a main memory unit (main memory), said units coupled so that the main memory can communicate only with the cache and so that the CPU can fetch information from and store information to the main memory only via the cache, and further coupled so that state machines representing the states of the cache and the main memory, respectively, are linked together, a method comprising the steps of:
    (a) comparing with said comparator an address of the cache to an address sent from the CPU while simultaneously fetching a copy of information from the data store encached at said address;
    (b) storing the fetched information into a temporary register before a dirty miss indication is provided by said comparator;
    (c) storing a copy of the information fetched from the main memory into the cache if either a clean or dirty miss indication is provided by the comparator, wherein step (c) takes place before dirty information stored in the temporary register is written back to the main memory if the comparator provides a dirty miss indication; and, (d) storing the information residing in the temporary register into the main memory if the comparator provides a dirty miss indication.

7. A method as in claim 6, if the CPU has requested a fetch of information from the main memory to the cache, further comprising:

freezing the CPU as soon as a clean or dirty miss of the desired information in the cache is indicated by the comparator.

8. A method as in claim 7, further comprising:

fetching information from the main memory to the cache;

waiting for an indication from the comparator to the CPU that the information has been transferred from the main memory to the cache;

unfreezing the CPU; and reading the information by the CPU from the cache substantially within one main memory access period after either a clean miss or a dirty miss.

* * * * *